US011507970B2

(12) United States Patent
Luk

(10) Patent No.: US 11,507,970 B2
(45) Date of Patent: Nov. 22, 2022

(54) DYNAMICALLY GENERATING A REDUCED ITEM PRICE

(71) Applicant: eBay Inc., San Jose, CA (US)

(72) Inventor: Alpha Kamchiu Luk, San Jose, CA (US)

(73) Assignee: EBAY INC., San Jose, CA (US)

( * ) Notice: Subject to any disclaimer, the term of this patent is extended or adjusted under 35 U.S.C. 154(b) by 0 days.

(21) Appl. No.: 17/498,876

(22) Filed: Oct. 12, 2021

(65) Prior Publication Data

US 2022/0101362 A1  Mar. 31, 2022

Related U.S. Application Data

(63) Continuation of application No. 16/688,079, filed on Nov. 19, 2019, which is a continuation of application No. 14/249,668, filed on Apr. 10, 2014, now Pat. No. 10,510,090.

(51) Int. Cl.
*G06Q 30/00* (2012.01)
*G06Q 30/02* (2012.01)

(52) U.S. Cl.
CPC ................ *G06Q 30/0222* (2013.01)

(58) Field of Classification Search
CPC ................................. G06Q 30/0222
See application file for complete search history.

(56) References Cited

U.S. PATENT DOCUMENTS

| 8,798,246 B1 | 8/2014 | Viswanathan |
| 10,510,090 B2 | 12/2019 | Luk |
| 2001/0049636 A1 | 12/2001 | Hudda et al. |
| 2008/0033831 A1 | 2/2008 | Boss et al. |
| 2008/0319849 A1 | 12/2008 | Rapoport |
| 2012/0265634 A1 | 10/2012 | Kinney |
| 2012/0271712 A1 | 10/2012 | Katzin et al. |
| 2013/0124360 A1 | 5/2013 | Mitrovic |
| 2014/0214520 A1 | 7/2014 | Longino |
| 2015/0012343 A1 | 1/2015 | Walker et al. |
| 2015/0294340 A1 | 10/2015 | Luk |
| 2020/0090205 A1 | 3/2020 | Luk |

OTHER PUBLICATIONS

"U.S. Appl. No. 16/688,079, Non Final Office Action dated Feb. 3, 2022", 5 pgs.

(Continued)

*Primary Examiner* — Alvin L Brown
(74) *Attorney, Agent, or Firm* — Schwegman Lundberg & Woessner, P.A.

(57) ABSTRACT

A system may receive information representing a first item and an item price of the first item from a first user device operated by a buyer. The first item may be available for sale by a merchant of a brick-and-mortar store. A plurality of sellers may be identified, the plurality of sellers may list a second item as being available for sale at the calculated reduced item price in an item listing for the second item. Moreover, the second item may be similar to the first item. A reduced item price may be calculated based on the item price of the first item received from the user device, the reduced item price representing a price lower than the item price of the first item. The item listing for the second item available for sale may be presented to the first user device operated by the buyer.

20 Claims, 8 Drawing Sheets

(56) References Cited

OTHER PUBLICATIONS

Final Office Action received for U.S. Appl. No. 14/249,668, dated Nov. 16, 2017, 21 pages.
Final Office Action received for U.S. Appl. No. 14/249,668, dated May 30, 2019, 5 pages.
Non-Final Office Action received for U.S. Appl. No. 14/249,668, dated Apr. 6, 2017, 28 pages.
Non-Final Office Action received for U.S. Appl. No. 14/249,668, dated Oct. 3, 2018, 18 pages.
Notice Of Allowance received for U.S. Appl. No. 14/249,668, dated Aug. 16, 2019, 8 pages.
Final Office Action received for U.S. Appl. No. 16/688,079, dated Apr. 5, 2021, 13 pages.
Non-Final Office Action Received for U.S. Appl. No. 16/688,079, dated Oct. 1, 2020, 12 pages.
Notice Of Allowance received for U.S. Appl. No. 16/688,079, dated Jul. 23, 2021, 8 Pages.
"U.S. Appl. No. 16/688,079, Notice of Allowance dated May 16, 2022", 7 pgs.

DYNAMICALLY GENERATING A REDUCED ITEM PRICE

CLAIM OF PRIORITY

This application is a Continuation of U.S. application Ser. No. 16/688,079 filed Nov. 19, 2019, which is a Continuation of U.S. application Ser. No. 14/249,668, filed Apr. 10, 2014, now U.S. Pat. No. 10,510,090, which is hereby incorporated by reference in its entirety.

TECHNICAL FIELD

The subject matter disclosed herein generally relates to the processing of data. Specifically, the present disclosure addresses systems and methods to present an item listing for an item available for sale at a reduced price.

BACKGROUND

A brick-and-mortar store may offer merchandise items available for sale at a price that is comparable to the price for the same item online. Therefore, a user browsing the brick-and-mortar may decide to purchase an item from the brick-and-mortar store rather than purchasing the item online.

BRIEF DESCRIPTION OF THE DRAWINGS

Some embodiments are illustrated by way of example and not limitation in the figures of the accompanying drawings.

DETAILED DESCRIPTION

Example methods and systems are directed to presenting an item listed at a reduced price. Examples merely typify possible variations. Unless explicitly stated otherwise, components and functions are optional and may be combined or subdivided, and operations may vary in sequence or be combined or subdivided. In the following description, for purposes of explanation, numerous specific details are set forth to provide a thorough understanding of example embodiments. It will be evident to one skilled in the art, however, that the present subject matter may be practiced without these specific details.

A brick-and-mortar store may list an item as being available for sale. The price of the item in the brick-and-mortar store may be comparable to the price of the item from an online listing. However, a system may be used to search and discover whether an online seller is willing to sell the item at a more affordable price to the buyer. The user may submit item information including the price of the item to the system and the system may the use the information to calculate a reduced item price. The online seller may submit also a price range at which the seller is willing to sell the item, which may include the reduced item price. The system can then identify the online seller as being able to list the item at the calculated reduced item price. In this way, the user browsing the brick-and-mortar store can be connected with the online seller willing to sell the item at the reduced item price.

Figure 1:
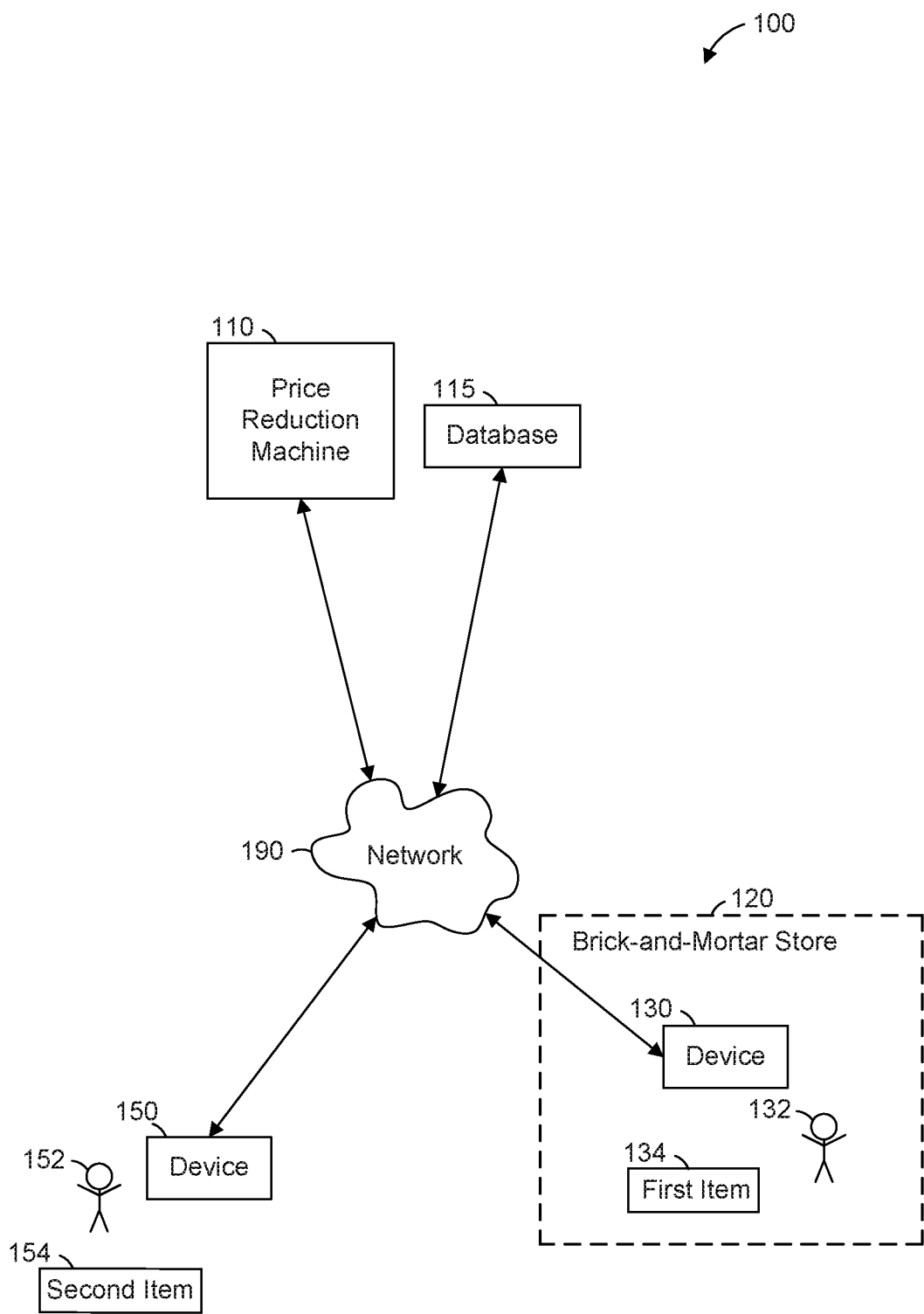
FIG. 1 is a network diagram illustrating a network environment suitable for presenting an item at a reduced price, according to some example embodiments.

FIG. 1 is a network diagram illustrating a network environment 100 suitable for presenting an item at a reduced price, according to some example embodiments. The network environment 100 includes a price reduction machine 110, a database 115, and devices 130, and 150, all communicatively coupled to each other via a network 190. The price reduction machine 110 and the devices 130, and 150 may each be implemented in a computer system, in whole or in part, as described below with respect to FIG. 8.

Also shown in FIG. 1 are users 132 and 152. One or both of the users 132 and 152 may be a human user (e.g., a human being), a machine user (e.g., a computer configured by a software program to interact with the device 130), or any suitable combination thereof (e.g., a human assisted by a machine or a machine supervised by a human). The user 132 is not part of the network environment 100, but is associated with the device 130 and may be a user of the device 130. For example, the device 130 may be a desktop computer, a vehicle computer, a tablet computer, a navigational device, a portable media device, or a smart phone belonging to the user 132. Likewise, the user 152 is not part of the network environment 100, but is associated with the device 150. As an example, the device 150 may be a desktop computer, a vehicle computer, a tablet computer, a navigational device, a portable media device, or a smart phone belonging to the user 152.

FIG. 1 may also include a first item 134 located within a brick-and-mortar store 120. The user 132 may be browsing the brick-and-mortar store 120 and viewing the first item 134 inside the brick-and-mortar store 120. The user 132 may submit information representing the first item 134 including the price of the first item 134 to the price reduction machine 110 via the network 190. The price reduction machine 110 may calculate a reduced item price based on the price of the first item 134. Moreover, the price reduction machine 110 may identify user 152 as listing a second item 154 at the calculated reduced item price in an item listing for the second item 154. The second item 154 may be similar or identical to the first item 134. Upon identifying user 152 as listing the second item 154 at the calculated reduced item price, the price reduction machine 110 may present the item listing for the second item 154 to the device 130 operated by user 132.

Any of the machines, databases, or devices shown in FIG. 1 may be implemented in a general-purpose computer modified (e.g., configured or programmed) by software to be a special-purpose computer to perform one or more of the functions described herein for that machine, database, or device. As used herein, a "database" is a data storage resource and may store data structured as a text file, a table, a spreadsheet, a relational database (e.g., an object-relational database), a triple store, a hierarchical data store, or any suitable combination thereof. Moreover, any two or more of the machines, databases, or devices illustrated in FIG. 1 may be combined into a single machine, and the functions described herein for any single machine, database, or device may be subdivided among multiple machines, databases, or devices.

The network 190 may be any network that enables communication between or among machines, databases, and devices (e.g., the price reduction machine 110 and the device 130). Accordingly, the network 190 may be a wired network, a wireless network (e.g., a mobile or cellular network), or any suitable combination thereof. The network 190 may include one or more portions that constitute a private network, a public network (e.g., the Internet), or any suitable combination thereof. Accordingly, the network 190 may include one or more portions that incorporate a local area network (LAN), a wide area network (WAN), the Internet, a mobile telephone network (e.g., a cellular network), a wired telephone network (e.g., a plain old telephone system (POTS) network), a wireless data network (e.g., WiFi network or WiMax network), or any suitable combination thereof. Any one or more portions of the network 190 may communicate information via a transmission medium. As used herein, "transmission medium" shall be taken to include any intangible medium that is capable of storing, encoding, or carrying instructions for execution by a machine, and includes digital or analog communication signals or other intangible media to facilitate communication of such software.

Figure 2:
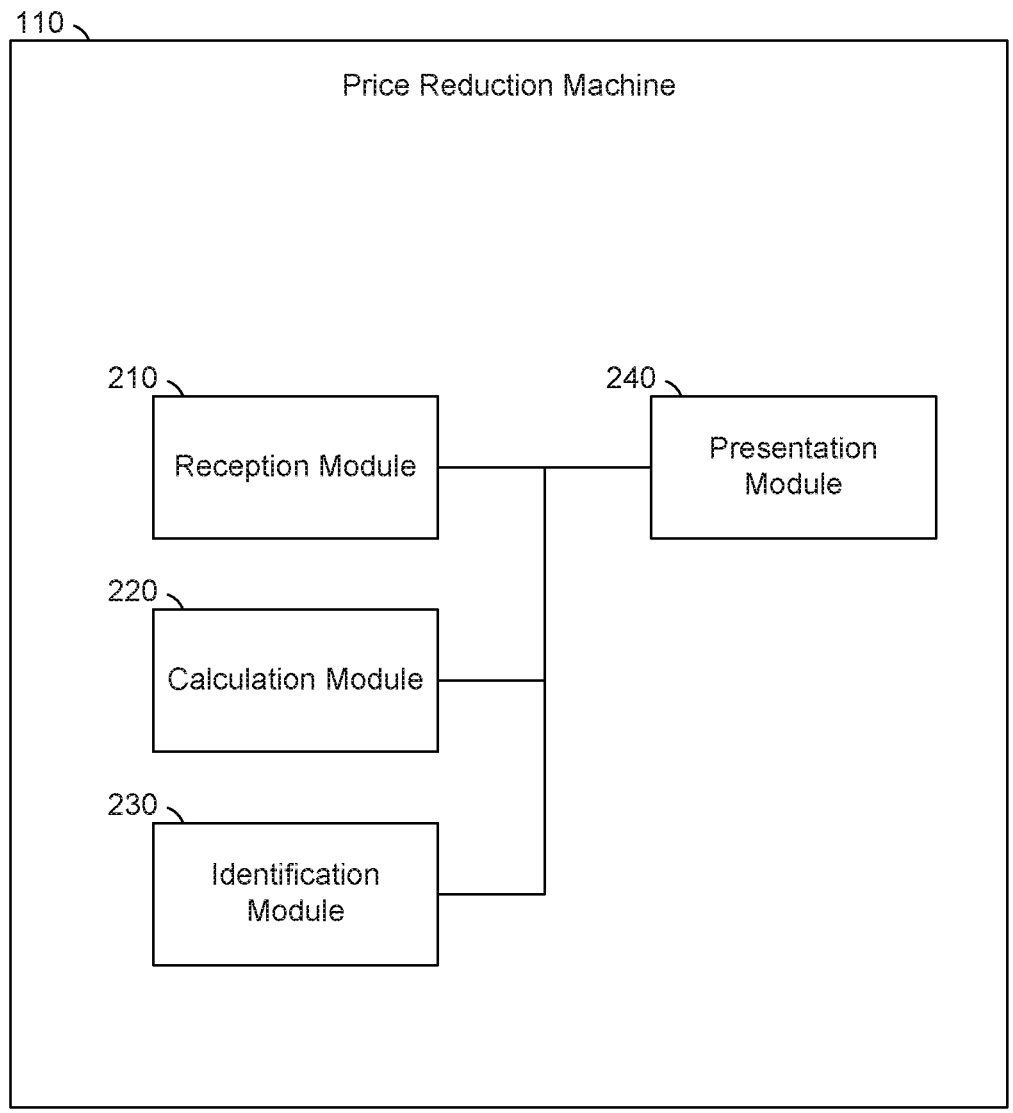
FIG. 2 is a block diagram illustrating components of a price reduction machine, according to some example embodiments.

FIG. 2 is a block diagram illustrating components of the price reduction machine 110, according to some example embodiments. The price reduction machine 110 is shown as including a reception module 210, a calculation module 220, an identification module 230, and a presentation module 240, all configured to communicate with each other (e.g., via a bus, shared memory, or a switch). Any one or more of the modules described herein may be implemented using hardware (e.g., a processor of a machine) or a combination of hardware and software. For example, any module described herein may configure a processor to perform the operations described herein for that module. Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

In various example embodiments, the reception module 210 is configured to receive information representing a first item and an item price of the first item from a user device of a buyer. The information representing the first item may include a bar code, an identification number, a description, and an image depicting the first item, or any suitable combination thereof. The item price of the first item may be established by a merchant of a brick-and-mortar store where the first item is available for sale. In various example embodiments, the reception module 210 is further configured to receive location data from the user device of the buyer. The location data may indicate a location of the first item. Location data may include location coordinates, an address, or any suitable combination thereof. In various example embodiments, the reception module 210 is further configured to receive an indication from a seller to list a second item as being available for sale at a reduced price, as further explained below.

In various example embodiments, the calculation module 220 is configured to calculate a reduced item price based on the item price of the first item received from the user device. In some instances, the calculated reduced item price may be represented as a price range. In various example embodiments, the calculation module 220 is configured to calculate the reduced item price in response to the identification module 230 determining that the location of the first item matches the location of the brick-and-mortar store operated by the merchant. The reduced item price may represent a price at which the buyer is willing to purchase the second item from an item listing for the second item instead of purchasing the first item from the brick-and-mortar store. In some instances, the calculated reduced item price represents a reduction in price from the item price of the first item or a price lower than the item price of the first item. In various example embodiments, the calculation module 220 is further configured to calculate the reduced item price based on pricing criteria corresponding to the plurality of sellers identified by the identification module 230, as further explained below. The pricing criteria may indicate constraints on behalf of a seller associated with pricing an item. For example, the seller may not be able to list an item below a certain item threshold price. As another example, each of the plurality of sellers may submit a price range that the seller is willing to sell an item similar to the first item. As such, the price range may represent a range of prices that the seller is willing to sell the item similar to the first item. Therefore, the calculation module 220 may be further configured to calculate the reduced item price based on the price range indicated by each of the plurality of sellers. In various example embodiments, the calculation module 220 is further configured to calculate the reduced item price based on price preferences of the buyer. The price preferences of the buyer may be received from the user device of the buyer by the reception module 210. The price preferences of the buyer may indicate a price range acceptable to the buyer that chooses to purchase the second item from an online seller, rather than purchasing the first item directly from the brick-and-mortar store. Therefore, the price preferences of the buyer may take into consideration the costs and delay associated with having the second item shipped to the buyer. As a result, the calculation module 220 may also calculate the reduced item price based on shipping costs of sending the second item to the buyer. For instance, if the shipping costs of sending the second item to the buyer are high, then the reduced item price may be significantly lower than the item price of the first item and vice versa. The calculation module 220 may also calculate the reduced item price based on delivery time of sending the second item to the buyer. The length of the delivery time of sending the second item to the buyer may be correlated with the calculated reduced item price. In other words, the longer it takes to deliver the second item, the lower the calculated reduced item price may be.

In various example embodiments, the identification module 230 is configured to identify a plurality of sellers that list the second item as being available for sale at the calculated reduced item price in the item listing for the second item. In various example embodiments, each of the plurality of sellers may indicate a price range which includes the calculated reduced item price. The price range may represent a range of prices that the seller is willing to sell the second item. Moreover, the identification module 230 may identify the plurality of sellers based on the price range indicated by each of the plurality of sellers. In this way, each of the plurality of sellers does not have to manually adjust the price of the second item to the calculated reduced item price. In various example embodiments, the identification module 230 is further configured to detect that the plurality of sellers adjusts the price of the second item from an original price to the reduced item price in the item listing for the second item. For instance, the seller may have originally listed the second item at the original price. However, upon being notified of the reduced item price, the seller may have adjusted the original price to the reduced item price. The identification module 230 may then identify the seller based on detecting that the seller adjusts the price of the second item. In various example embodiments, the identification module 230 is further configured to identify the plurality of sellers based on the reception module 210 receiving the indication from the plurality of sellers to list the second item as being available for sale at the reduced item price. For instance, the reception module 210 may receive a message from the plurality of sellers that the plurality of sellers is willing to list the second item at the reduced item price. In various example embodiments, the presentation module 240 may present the reduced item price to the plurality of sellers. In this way, the plurality of sellers can make an informed decision of whether to list the second item at the reduced item price.

In various example embodiments, the identification module 230 is further configured to determine that the second item is similar to the first item based on comparing item characteristics of the second item with item characteristics the first item. For instance, the identification module 230 may determine that the second item and the first item share a threshold amount of item characteristics. As an example, the second item may be referenced by the same identification number as the first item. As another example, the second item may serve a same function as the first item. As another example, the second item and the first item may both share a similar description. In some instances, the second item may be identical to the first item.

In various example embodiments, the identification module 230 is further configured to identify the plurality of sellers based on matching the information representing the first item to item listings managed by the plurality of sellers. For instance, the information used to describe the first item may be matched with descriptions from the item listings managed by the plurality of sellers. Therefore each of the plurality of sellers may have an item listing for an item with a description that matches with the first item (e.g., an item listing for an item similar to the first item). In various example embodiments, the identification module 230 is further configured to determine that the location of the first item matches a location of the brick-and-mortar store based on the location data received at the reception module 210. As stated previously, the brick-and-mortar store may be where the first item is available for sale. Moreover, the item price of the first item may be established by the merchant operating the brick-and-mortar store. The location match performed by the identification module 230 may be used to verify that the first item is located within the brick-and-mortar store when the reception module 210 receives the information representing the first item and the item price of the first item from the user device of the buyer.

In various example embodiments, the presentation module 250 is configured to present the item listing for the second item available for sale at the reduced price to the user device of the buyer. In various example embodiments, the second item may only be available for at the reduced price for a predetermined duration of time. After the predetermined duration of time elapses, then the price of the second item may increase. The presentation module 250 may cause the user device of the buyer to display the item listing for the second item. The presentation module 250 may also display information of the seller that lists the second item at the reduced item price. For instance, contact information for the seller may be displayed.

Figure 3:
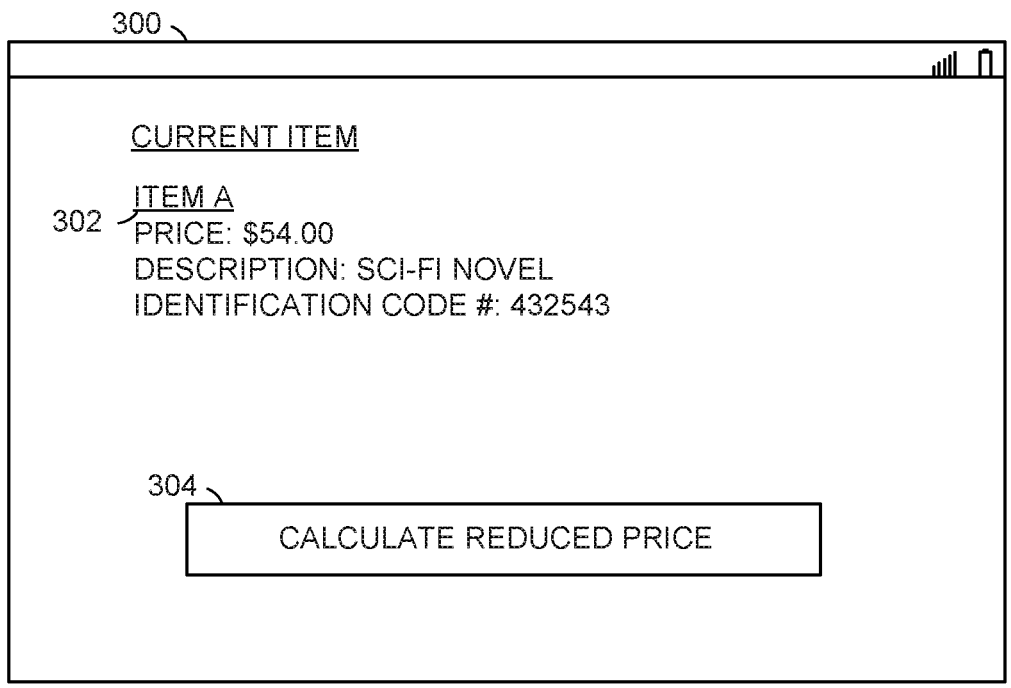
FIG. 3 is an example user interface of an option to calculate a reduced item price, according to some example embodiments.

FIG. 3 is an example user interface 300 of an option to calculate a reduced item price, according to some example embodiments. The user interface 300 may display information representing an item 302. Moreover, the user interface 300 may be displayed on a user device of the buyer. As shown in FIG. 3, the information representing the item 302 may include a price of the item 302, a description of the item 302, and an identification code of the item 302. The example user interface 300 may also include an option 304 to calculate a reduce item price. Upon clicking on the option 304, information representing the item 302 and the item price of the item 302 may be sent from the user device of the buyer to the reception module 210 of the price reduction machine 110.

Figure 4:
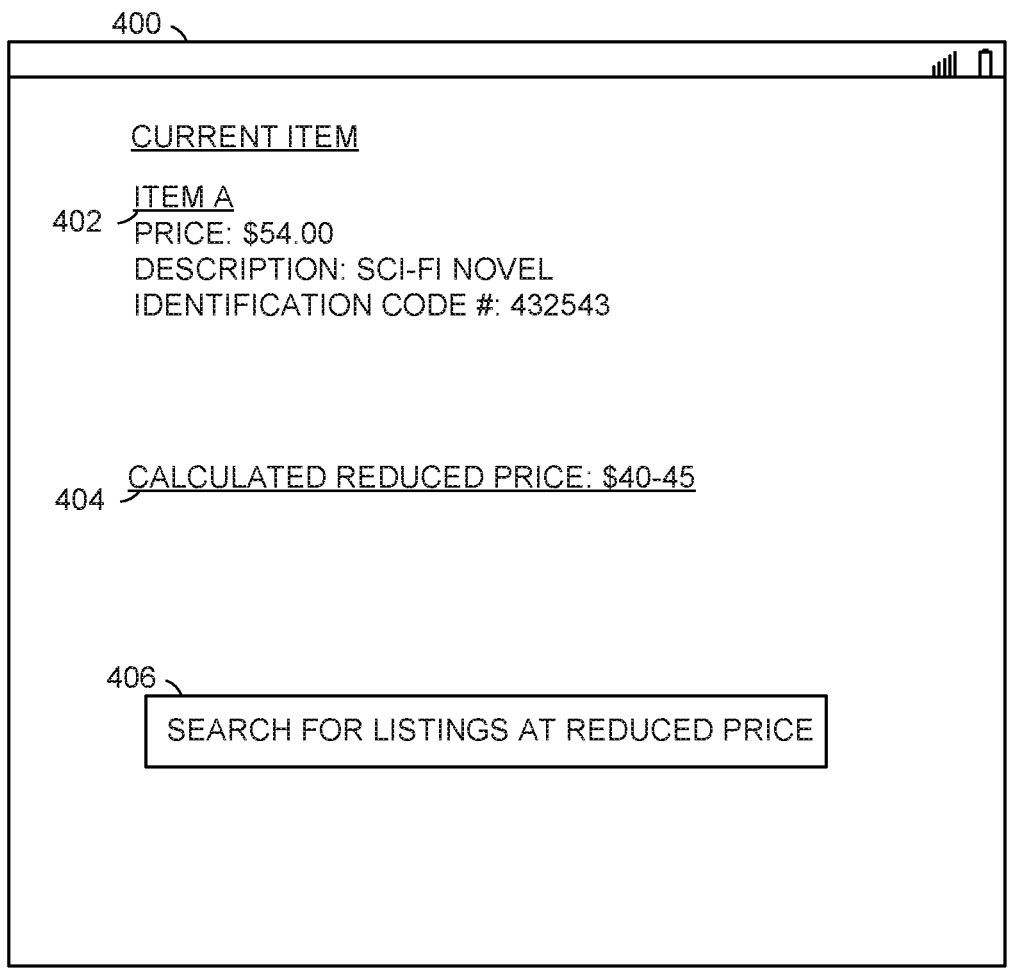
FIG. 4 is an example user interface of an option to search for item listings at the calculated reduced item price, according to some example embodiments.

FIG. 4 is an example user interface 400 of an option to search for item listings at the calculated reduced item price, according to some example embodiments. In response to the user clicking on the option 304 of FIG. 3, the calculated reduced item price 404 may be displayed to the user in the user interface 400. In some embodiments, the calculated reduced item price 404 may be represented as a price range. Moreover, the user interface 400 may include the option 406 to search item listings for items available for sale at the calculated reduce item price 404.

Figure 5:
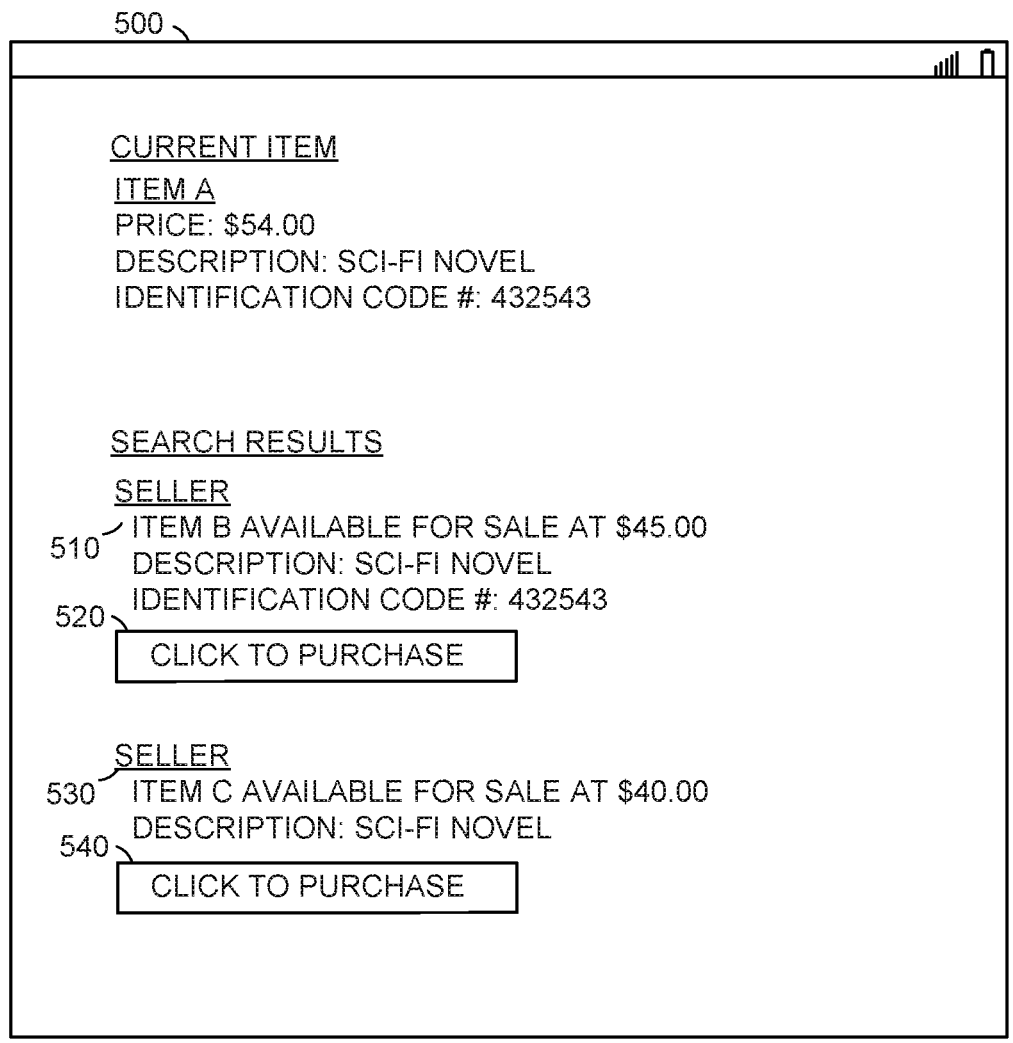
FIG. 5 is an example user interface of a search results page of sellers listing an item at the calculated reduced item price, according to some example embodiments.

FIG. 5 is an example user interface 500 of a search results page of sellers listing an item at the calculated reduced item price, according to some example embodiments. The sellers 510 and 520 may be identified by the identification module 230 as listing an item as being available for sale within the range indicated by the calculated reduced price 404 indicated in FIG. 4. As stated previously, the calculated reduced item price may be represented as a price range. Each of the selected sellers 510 and 520 may list an item that is similar to the item 302 of FIG. 3. The identification module 230 may determine the item B listed by the seller 510 is similar to the item 302 of FIG. 3 by comparing the item characteristics of item B with the item characteristics of the item 302. Likewise, the identification module 230 may determine the item C listed by the seller 530 is similar to the item 302 of FIG. 3 by comparing the item characteristics of item C with the item characteristics the item 302. Additionally, the example user interface 500 may also include an option to purchase 520 the item B available for sale from seller 510 as well as an option to purchase 540 the item C available for sale from seller 530.

Figure 6:
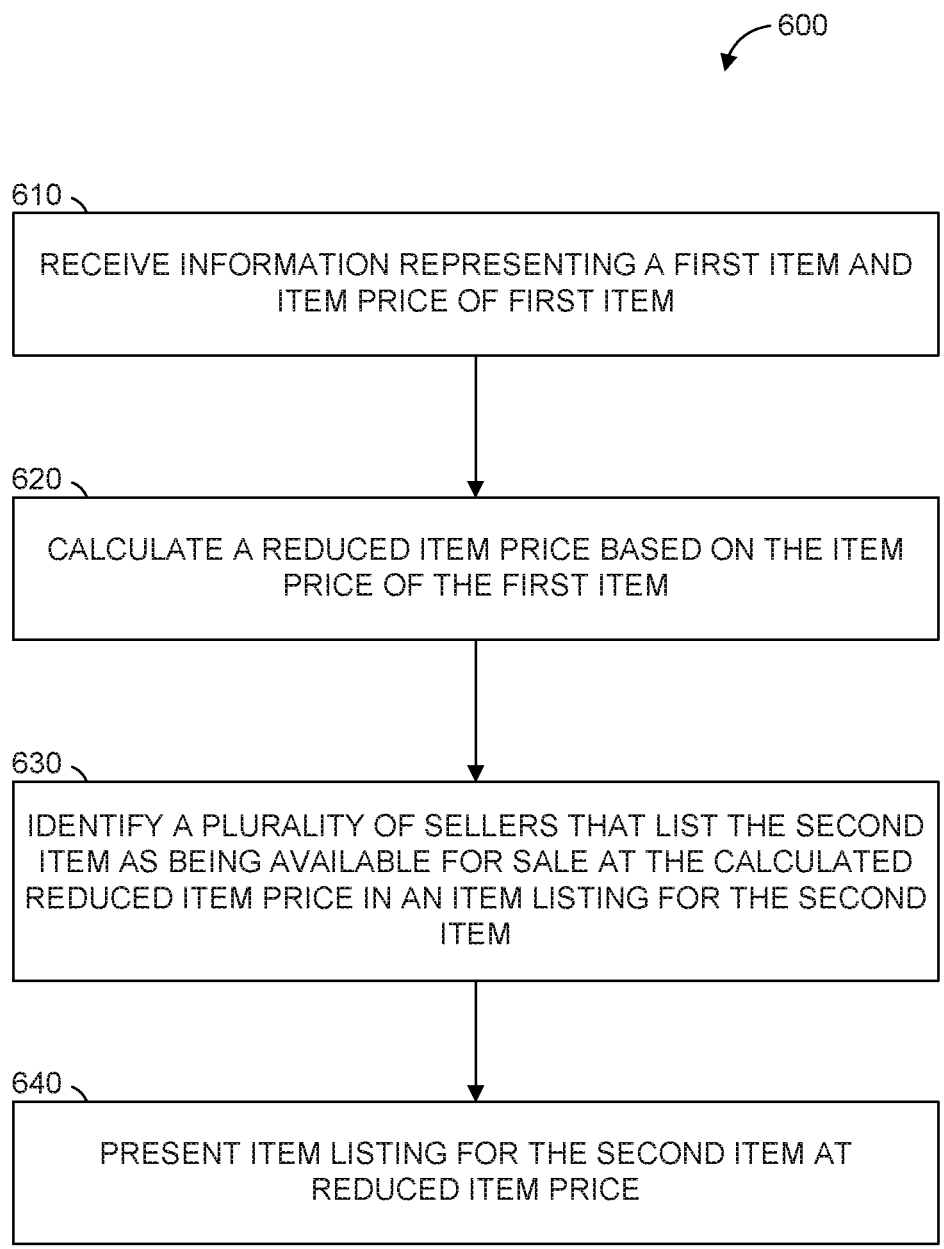
FIG. 6-7 are flowcharts illustrating operations of a price reduction machine in performing a method of presenting an item listing for an item at a reduced item price, according to some example embodiments.
Figure 7:
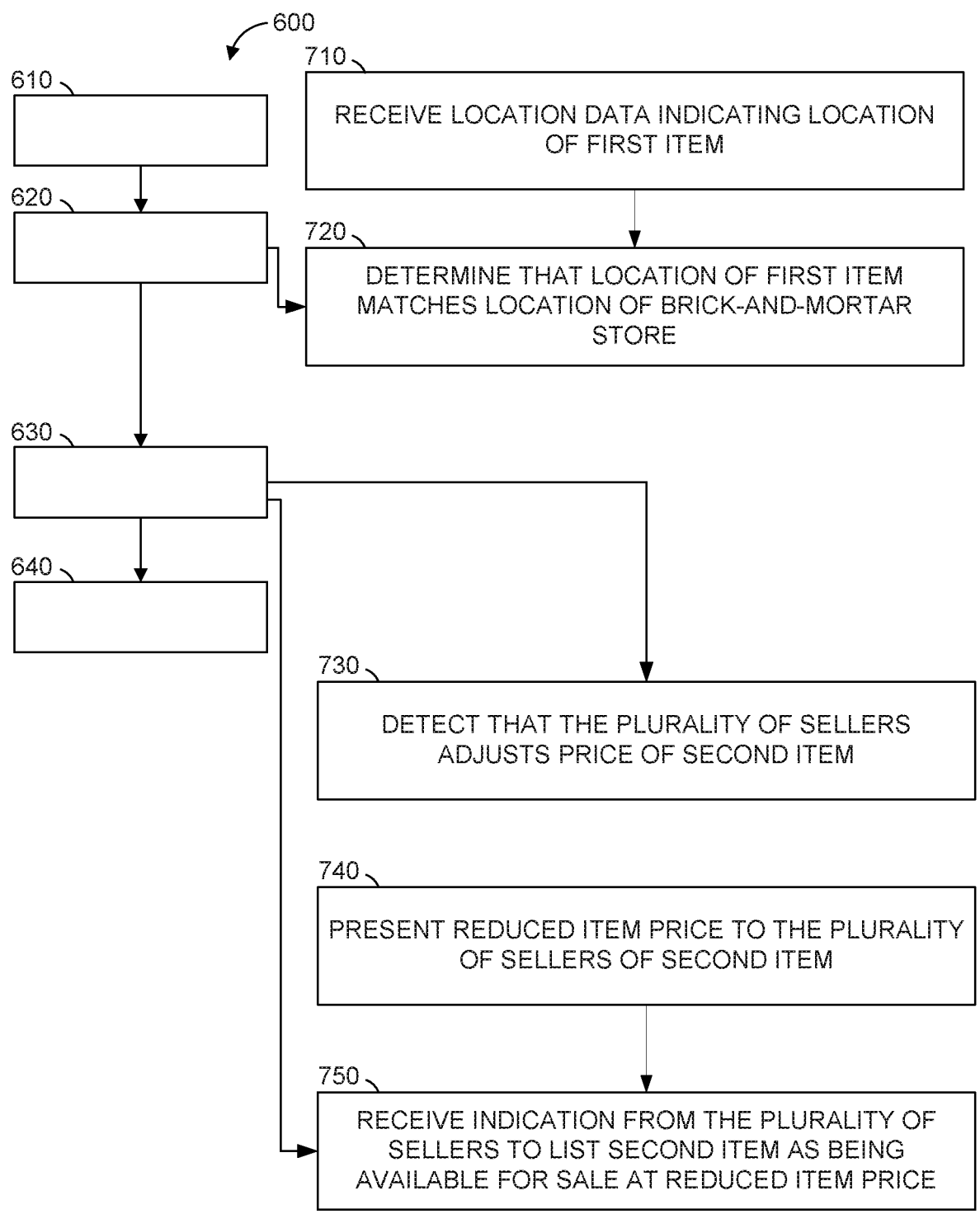

FIG. 6-7 are flowcharts illustrating operations of the price reduction machine 110 in performing a method 600 of presenting an item listing for an item at a reduced item price, according to some example embodiments. Operations in the method 600 may be performed by the price reduction machine 110, using modules described above with respect to FIG. 2. As shown in FIG. 6, the method 600 includes operations 610, 620, 630, 640, and 650.

At operation 610, the reception module 210 may receive information representing a first item and an item price of the first item from a user device of a buyer.

At operation 620, the calculation module 220 may calculate a reduced item price based on the item price of the first item received from the user device.

At operation 630, the identification module 230 may identify a plurality of sellers that list the second item as being available for sale at the calculated reduced item price in an item listing for the second item.

At operation 640, the presentation module 250 may present the item listing for the second item available for sale at the reduced price to the user device of the buyer.

As shown in FIG. 7, the method 600 may include one or more of operations 710, 720, and 730. One of more of operations 710 and 720 may be performed as part (e.g., a precursor task, a subroutine, or a portion) of operation 620. One or more of operations 730-750 may be performed as part (e.g., a precursor task, a subroutine, or a portion) of operation 630.

At operation 710, the reception module 210 may receive location data that indicates a location of the first item.

At operation 720, the identification module 230 may determine that the location of the first item matches the location of the brick-and-mortar store. Moreover, calculation module 220 may calculate the reduced item price in response to the determination that the location of the first item matches the location of the brick-and-mortar store.

At operation 730, the identification module 230 may detect that the plurality of sellers adjusts the price of the second item from an original price to the reduced item price in the item listing for the second item.

At operation 740, the presentation module 250 may present the reduced item price to the plurality of sellers of the second item.

At operation 750, the reception module 210 may receive an indication from the seller to list the second item as being available for sale at the reduced item price.

Figure 8:
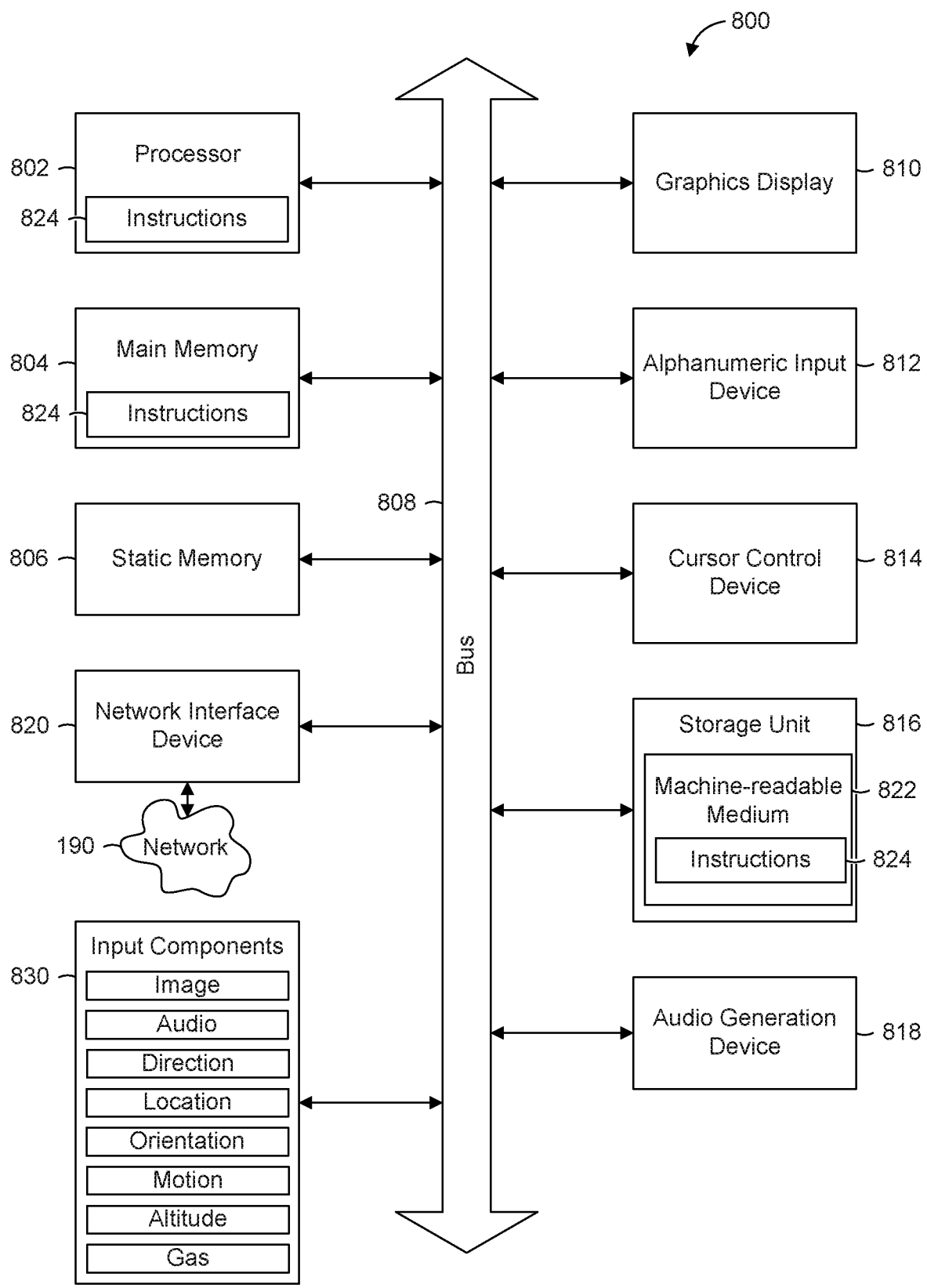
FIG. 8 is a block diagram illustrating components of a machine, according to some example embodiments, able to read instructions from a machine-readable medium and perform any one or more of the methodologies discussed herein.

FIG. 8 is a block diagram illustrating components of a machine 800, according to some example embodiments, able to read instructions 824 from a machine-readable medium 822 (e.g., a machine-readable storage medium, a computer-readable storage medium, or any suitable combination thereof) and perform any one or more of the methodologies discussed herein, in whole or in part. Specifically, FIG. 8 shows the machine 800 in the example form of a computer system within which the instructions 824 (e.g., software, a program, an application, an applet, an app, or other executable code) for causing the machine 800 to perform any one or more of the methodologies discussed herein may be executed, in whole or in part. In alternative embodiments, the machine 800 operates as a standalone device or may be connected (e.g., networked) to other machines. In a networked deployment, the machine 800 may operate in the capacity of a server machine or a client machine in a server-client network environment, or as a peer machine in a distributed (e.g., peer-to-peer) network environment. The machine 800 may be a server computer, a client computer, a personal computer (PC), a tablet computer, a laptop computer, a netbook, a cellular telephone, a smartphone, a set-top box (STB), a personal digital assistant (PDA), a web appliance, a network router, a network switch, a network bridge, or any machine capable of executing the instructions 824, sequentially or otherwise, that specify actions to be taken by that machine. Further, while only a single machine is illustrated, the term "machine" shall also be taken to include any collection of machines that individually or jointly execute the instructions 824 to perform all or part of any one or more of the methodologies discussed herein.

The machine 800 includes a processor 802 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 804, and a static memory 806, which are configured to communicate with each other via a bus 808. The processor 802 may contain microcircuits that are configurable, temporarily or permanently, by some or all of the instructions 824 such that the processor 802 is configurable to perform any one or more of the methodologies described herein, in whole or in part. For example, a set of one or more microcircuits of the processor 802 may be configurable to execute one or more modules (e.g., software modules) described herein.

The machine 800 may further include a graphics display 810 (e.g., a plasma display panel (PDP), a light emitting diode (LED) display, a liquid crystal display (LCD), a projector, a cathode ray tube (CRT), or any other display capable of displaying graphics or video). The machine 800 may also include an alphanumeric input device 812 (e.g., a keyboard or keypad), a cursor control device 814 (e.g., a mouse, a touchpad, a trackball, a joystick, a motion sensor, an eye tracking device, or other pointing instrument), a storage unit 816, an audio generation device 818 (e.g., a sound card, an amplifier, a speaker, a headphone jack, or any suitable combination thereof), and a network interface device 820.

The storage unit 816 includes the machine-readable medium 822 (e.g., a tangible and non-transitory machine-readable storage medium) on which are stored the instructions 824 embodying any one or more of the methodologies or functions described herein. The instructions 824 may also reside, completely or at least partially, within the main memory 804, within the processor 802 (e.g., within the processor's cache memory), or both, before or during execution thereof by the machine 800. Accordingly, the main memory 804 and the processor 802 may be considered machine-readable media (e.g., tangible and non-transitory machine-readable media). The instructions 824 may be transmitted or received over the network 190 via the network interface device 820. For example, the network interface device 820 may communicate the instructions 824 using any one or more transfer protocols (e.g., hypertext transfer protocol (HTTP)).

In some example embodiments, the machine 800 may be a portable computing device, such as a smart phone or tablet computer, and have one or more additional input components 830 (e.g., sensors or gauges). Examples of such input components 830 include an image input component (e.g., one or more cameras), an audio input component (e.g., a microphone), a direction input component (e.g., a compass), a location input component (e.g., a global positioning system (GPS) receiver), an orientation component (e.g., a gyroscope), a motion detection component (e.g., one or more accelerometers), an altitude detection component (e.g., an altimeter), and a gas detection component (e.g., a gas sensor). Inputs harvested by any one or more of these input components may be accessible and available for use by any of modules described herein.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 822 is shown in an example embodiment to be a single medium, the term "machine-readable medium" should be taken to include a single medium or multiple media (e.g., a centralized or distributed database, or associated caches and servers) able to store instructions. The term "machine-readable medium" shall also be taken to include any medium, or combination of multiple media, that is capable of storing the instructions 824 for execution by the machine 800, such that the instructions 824, when executed by one or more processors of the machine 800 (e.g., processor 802), cause the machine 800 to perform any one or more of the methodologies described herein, in whole or in part. Accordingly, a "machine-readable medium" refers to a single storage apparatus or device, as well as cloud-based storage systems or storage networks that include multiple storage apparatus or devices. The term "machine-readable medium" shall accordingly be taken to include, but not be limited to, one or more tangible data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of the subject matter discussed herein may be presented in terms of algorithms or symbolic representations of operations on data stored as bits or binary digital signals within a machine memory (e.g., a computer memory). Such algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or any suitable combination thereof), registers, or other machine components that receive, store, transmit, or display information. Furthermore, unless specifically stated otherwise, the terms "a" or "an" are herein used, as is common in patent documents, to include one or more than one instance. Finally, as used herein, the conjunction "or" refers to a non-exclusive "or," unless specifically stated otherwise.

What is claimed is:

1. A method comprising:
   receiving, by a processor from a user device, information representing a first item and an item price of the first item available for sale;
   causing to be displayed, at the user device, a first user interface that includes an option to search for a second item at a reduced price;
   calculating a reduced item price based on the item price of the first item and a price range associated with each of a plurality of sellers, the reduced item price representing a price lower than the item price of the first item;
   identifying, in response to receiving a selection of the option to search for the second item at the reduced price, a plurality of item listings that list a second item having similar characteristics to the first item and being available for sale at the reduced item price, the second item being separate from the first item, the plurality of item listings being associated with the plurality of sellers; and
   causing a second user interface to be displayed by the user device in response to the selection of the option to search for the second item at the reduced price, the second user interface displaying the second item.

2. The method of claim 1, wherein the calculating the reduced item price is further based on pricing criteria corresponding to the plurality of sellers.

3. The method of claim 1, wherein the calculating the reduced item price is further based on price preferences received from the user device.

4. The method of claim 1, wherein the calculating the reduced item price is further based on shipping costs of sending the second item to a user associated with the user device.

5. The method of claim 1, further comprising detecting that a price of the second item is adjusted from an original price to the reduced item price in the item listing for the second item.

6. The method of claim 1, further comprising causing the reduced item price to be displayed on user devices associated with the plurality of sellers, and wherein identifying the plurality of item listings is further based on receiving an indication from the plurality of sellers to list the second item as being available for sale at the reduced item price.

7. The method of claim 1, further comprising determining that the second item is similar to the first item based on comparing item characteristics of the second item with item characteristics of the first item.

8. The method of claim 1, wherein identifying the plurality of item listings is based on matching the information representing the first item to item listings managed by the plurality of sellers.

9. The method of claim 1, wherein the price range represents a range of prices that each of the plurality of sellers is willing to sell the second item.

10. The method of claim 1, further comprising:
    receiving location data from the user device, the location data indicating a location of the first item; and
    determining that the location data matches a location of a brick-and-mortar store that sells the first item.

11. The method of claim 1, wherein the information representing the first item includes at least one of a bar code, an identification number, a description, and an image depicting the item.

12. A system comprising:
    one or more hardware processors;
    memory to store instructions that, when executed by the one or more hardware processors, cause the one or more hardware processors to perform operations comprising:
       receiving, by a processor from a user device, information representing a first item and an item price of the first item available for sale;
       causing to be displayed, at the user device, a first user interface that includes an option to search for a second item at a reduced price;
       calculating a reduced item price based on the item price of the first item and a price range associated with each of a plurality of sellers, the reduced item price representing a price lower than the item price of the first item;
       identifying, in response to receiving a selection of the Option to search for the second item at the reduced price, a plurality of item listings that list a second item having similar characteristics to the first item and being available for sale at the reduced item price, the second item being separate from the first item, the plurality of item listings being associated with the plurality of sellers; and
       causing a second user interface to be displayed by the user device in response to the selection of the option to search for the second item at the reduced price, the second user interface displaying the second item.

13. The system of claim 12, wherein the calculating the reduced item price is further based on pricing criteria corresponding to the plurality of sellers.

14. The system of claim 12, wherein the calculating the reduced item price is further based on price preferences received from the user device.

15. The system of claim 12, wherein the calculating the reduced item price is further based on shipping costs of sending the second item to a user associated with the user device.

16. The system of claim 12, the operations further comprising detecting that a price of the second item is adjusted from an original price to the reduced item price in the item listing for the second item.

17. The system of claim 12, further comprising:
causing the reduced item price to be displayed on user devices associated with the plurality of sellers, and wherein identifying the plurality of item listings is further based on receiving an indication from the plurality of sellers to list the second item as being available for sale at the reduced item price.

18. The system of claim 12, the operations further comprising:
determining that the second item is similar to the first item based on comparing item characteristics of the second item with item characteristics of the first item.

19. The system of claim 12, the operations further comprising:
receiving location data from the user device, the location data indicating a location of the first item; and
determining that the location data matches a location of a brick-and-mortar store that sells the first item.

20. A non-transitory machine-readable medium storing instructions that, when executed by one or more processors of a machine, cause the machine to perform operations comprising:
receiving, by a processor from a user device, information representing a first item and an item price of the first item available for sale;
causing to be displayed, at the user device, a first user interface that includes an option to search for a second item at a reduced price;
calculating a reduced item price based on the item price of the first item and a price range associated with each of a plurality of sellers, the reduced item price representing a price lower than the item price of the first item;
identifying, in response to receiving a selection of the option to search for the second item at the reduced price, a plurality of item listings that list a second item having similar characteristics to the first item and being available for sale at the reduced item price, the second item being separate from the first item, the plurality of item listings being associated with the plurality of sellers; and
causing a second user interface to be displayed by the user device in response to the selection of the option to search for the second item at the reduced price, the second user interface displaying the second item.

\* \* \* \* \*